United States Patent
Lee et al.

(10) Patent No.: US 9,523,167 B2
(45) Date of Patent: Dec. 20, 2016

(54) GARMENT DYEING MACHINE

(75) Inventors: Sze Ngok Lee, Hong Kong (HK);
Kuan Yau Nancy Chang, Kowloon (HK)

(73) Assignee: Clover Mystique Co. Ltd., Hong Kong (HK)

( * ) Notice: Subject to any disclaimer, the term of this patent is extended or adjusted under 35 U.S.C. 154(b) by 898 days.

(21) Appl. No.: 13/608,723

(22) Filed: Sep. 10, 2012

(65) Prior Publication Data
US 2013/0219971 A1 Aug. 29, 2013

Related U.S. Application Data

(60) Provisional application No. 61/604,010, filed on Feb. 28, 2012.

(51) Int. Cl.
| | | |
|---|---|---|
| *D06B 19/00* | (2006.01) | |
| *D06B 5/24* | (2006.01) | |
| *D06B 23/04* | (2006.01) | |
| *D06B 23/14* | (2006.01) | |
| *D06B 1/02* | (2006.01) | |

(52) U.S. Cl.
CPC .............. *D06B 19/0088* (2013.01); *D06B 1/02* (2013.01); *D06B 5/24* (2013.01); *D06B 23/04* (2013.01); *D06B 23/14* (2013.01); *Y02P 70/643* (2015.11)

(58) Field of Classification Search
CPC ....................................................... D06B 5/24
See application file for complete search history.

(56) References Cited

U.S. PATENT DOCUMENTS

| 2,511,796 | A | * | 6/1950 | Fitpold ........................... 223/68 |
|---|---|---|---|---|
| 3,653,562 | A | | 4/1972 | Kronsbein |
| 4,483,032 | A | * | 11/1984 | Christ et al. .................. 8/149.1 |
| 5,210,896 | A | | 5/1993 | Hertig et al. |
| 5,288,322 | A | | 2/1994 | Hanna et al. |
| 5,409,504 | A | * | 4/1995 | Fritzsche ......................... 8/444 |
| 2004/0123368 | A1 | | 7/2004 | Bingham et al. |
| 2004/0177454 | A1 | | 9/2004 | Bentham |
| 2008/0229522 | A1 | | 9/2008 | Piana et al. |
| 2011/0016019 | A1 | | 1/2011 | Piana et al. |

FOREIGN PATENT DOCUMENTS

| CN | 201358371 Y | 12/2009 |
|---|---|---|
| CN | 201809655 U | 4/2011 |
| JP | 62-263368 A | 11/1987 |
| JP | 2004-154517 A | 6/2004 |
| KR | 10-0792559 B1 | 1/2008 |
| WO | WO 0186052 A1 * | 11/2001 |

(Continued)

OTHER PUBLICATIONS

International Search Report for related PCT application No. PCT/CN2012/081184, Mailed Dec. 27, 2012, 4 pages.

(Continued)

*Primary Examiner* — David Cormier
(74) *Attorney, Agent, or Firm* — Ware, Fressola, Maguire & Barber LLP

(57) ABSTRACT

A garment dyeing machine (10) includes a container (12), a roller (22) to which brassieres are releasably attachable, the roller (22) being within the container (12) and rotatable relative to the container (12) about an axis of rotation (R-R), the garment dyeing machine having two nozzles (24) for spraying a dye solution onto the roller (22).

12 Claims, 14 Drawing Sheets

(56) References Cited

FOREIGN PATENT DOCUMENTS

WO       2008/115685 A1     9/2008
WO   WO2010/126455 A1   11/2010

OTHER PUBLICATIONS

Taiwan Office Action dated Jun. 1, 2016 (received Jun. 3, 2016), including Search report (p. 9), application No. 101134126, nine pages total.
English abstract for KR 100792559 B1, one page, Jan. 10, 2008.
English abstract for CN 201358371 Y, two pages, Dec. 9, 2009.
English abstract for CN 201809655U, two pages, Apr. 27, 2011.
Supplementary European Search Report, application No. Ep 12 86 9835 (regional phase of PCT/CN2012/081184 claiming benefit of U.S. Appl. No. 61/604,010), dated Jun. 8, 2016, 7 pages.
Office Action issued by the Japanese Patent Office on Sep. 26, 2016 in the corresponding Japanese Patent Application 2014-559058, 4 pages.
Machine translation of Japanese Patent Application Publication No. S62-263368, 4 pages, Nov. 16, 1987.

* cited by examiner

GARMENT DYEING MACHINE

CROSS REFERENCE TO RELATED APPLICATIONS

This application claims priority in U.S. Provisional Patent application Ser. No. 61/604,010, filed 28 Feb. 2012, the content of which is hereby incorporated by reference.

FIELD OF THE INVENTION

This invention relates to a garment dyeing machine, in particular a dyeing machine which is suitable (but not limited) for dyeing such garments as lingerie and brassieres.

BACKGROUND OF THE INVENTION

In existing garment dyeing machines, a large quantity of water is required for dyeing garments, in particular brassieres. In particular, in conventional dyeing operations, the fabric to dye solution ratio by weight is roughly 1:4. Such is environmentally very unfriendly, and limits the development of garment dyeing industry in places with no abundant water supply.

It is thus an object of the present invention to provide a garment dyeing machine in which the aforesaid shortcomings are mitigated, or at least to provide a useful alternative to the trade and public.

SUMMARY OF THE INVENTION

According to the present invention, there is provided a garment dyeing machine including a container, at least one roller to which at least one piece of garment is releasably attachable, said roller being within said container and rotatable relative to said container about an axis of rotation, and at least one nozzle adapted to spray a dye solution onto said roller.

BRIEF DESCRIPTION OF THE DRAWINGS

A garment dyeing machine according to an embodiment of the present invention will now be described, by way of an example only, with reference to the accompany drawings, in which.

DESCRIPTION OF THE EMBODIMENTS

Figure 1:
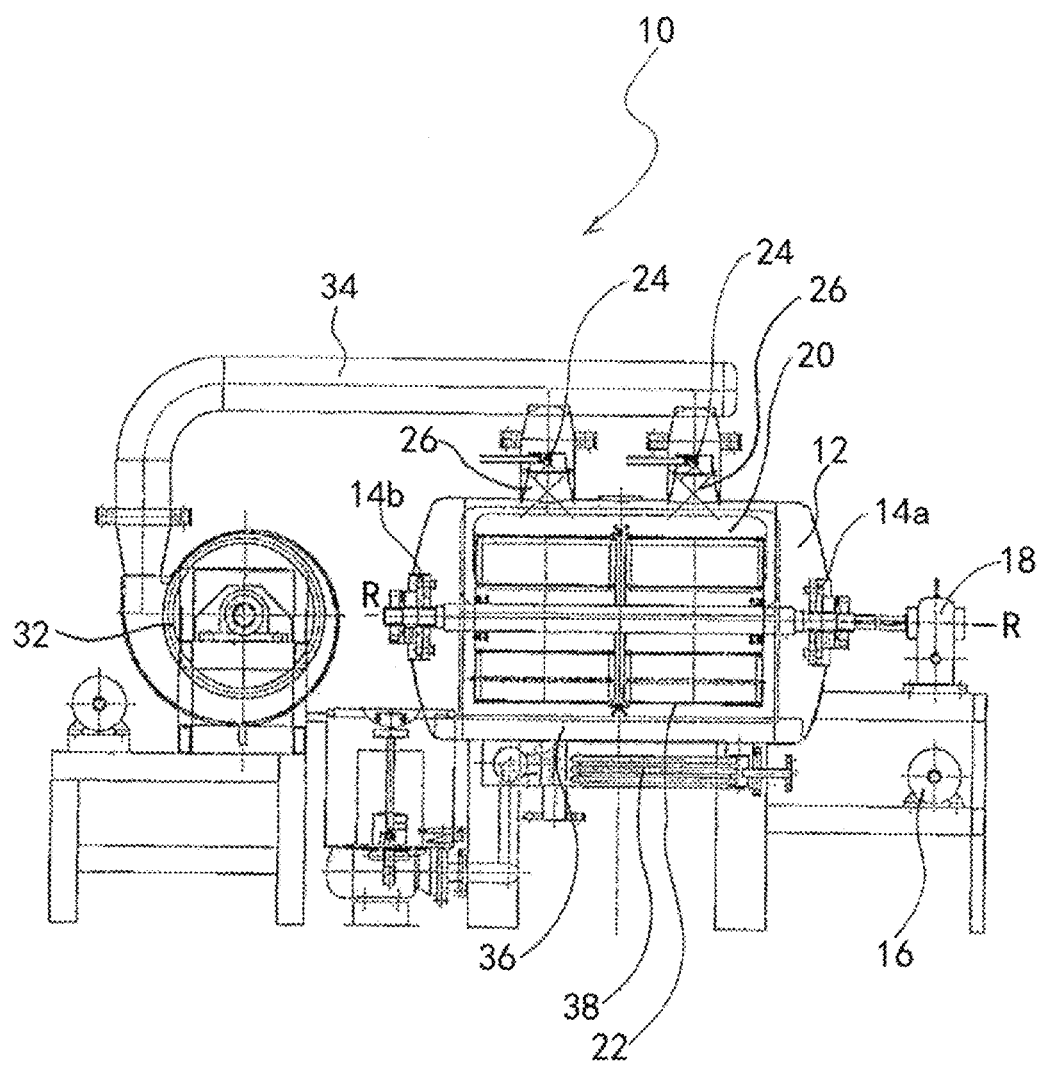
FIG. 1 is a front view of a garment dyeing machine according to an embodiment of the present invention.
Figure 2:
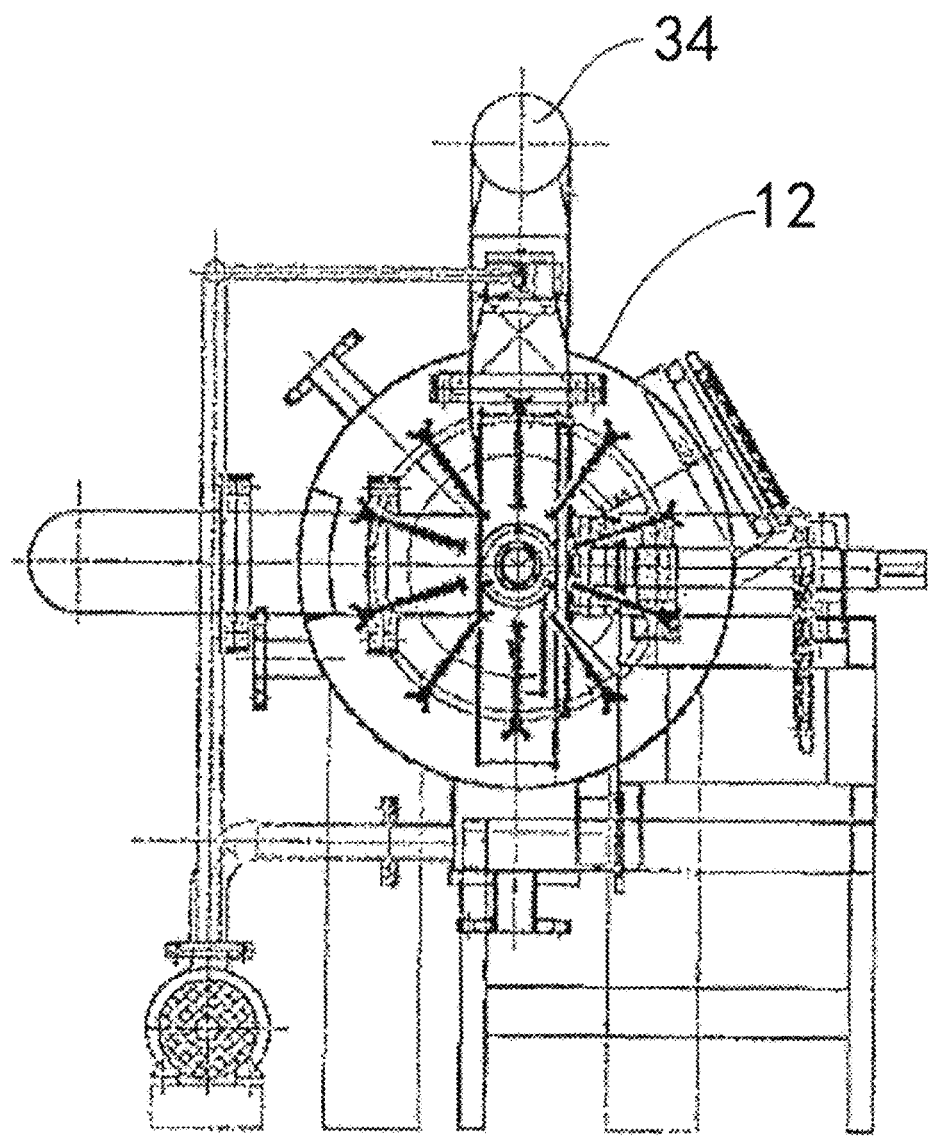
FIG. 2 is a side view of the garment dyeing machine of FIG. 1.
Figure 3:
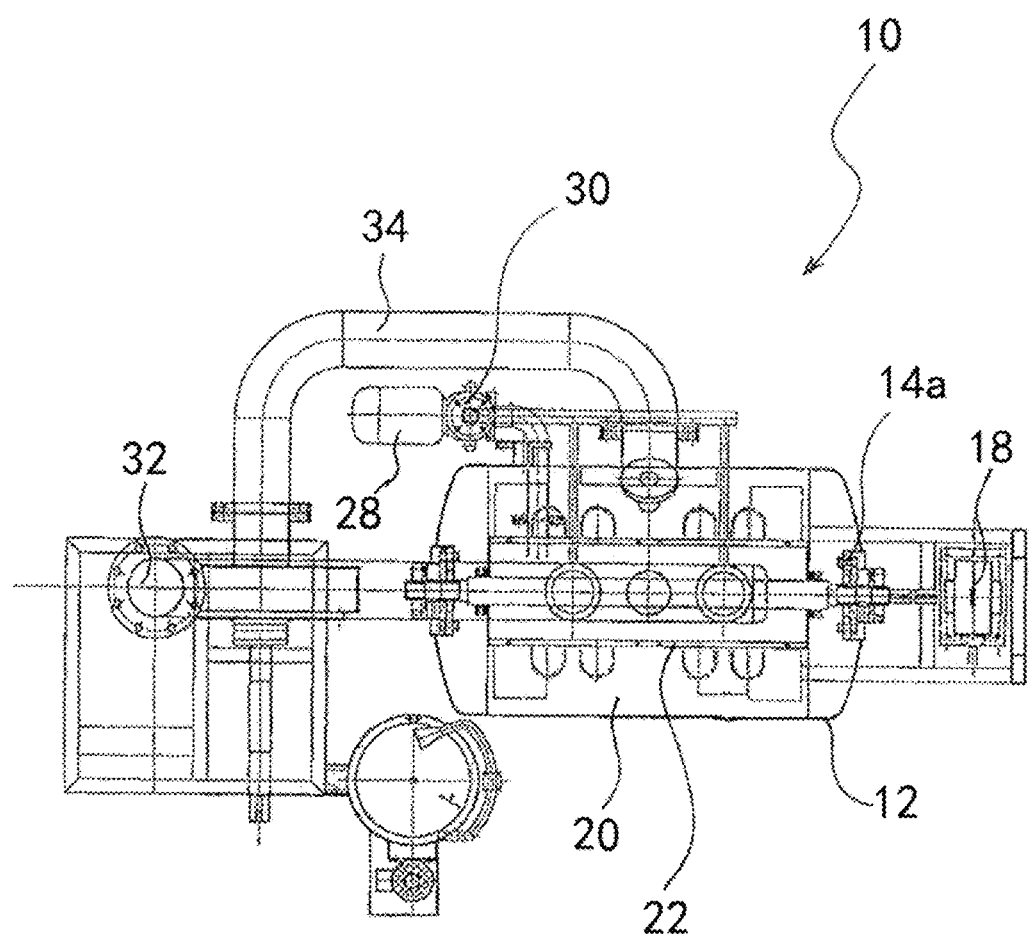
FIG. 3 is a top view of the garment dyeing machine of FIG. 1.

A garment dyeing machine according to an embodiment of the present invention is shown in FIGS. 1 to 3, and generally designated as 10. The machine 10 is suitable (but not limited) for dyeing such garments as lingerie and brassieres. The machine 10 includes a generally cylindrical container 12 with a pair of couplings 14a, 14b. A power motor 16 is associated with a power transmitter 18, which is connected with the coupling 14a. Upon operation of the power motor 16, the power transmitter 18 is activated to cause the coupling 14a to rotate about a horizontal axis of rotation R-R.

The container 12 has a cylindrical interior cavity 20 in which a roller 22 is installed. The roller 22 is engaged at one longitudinal end with the coupling 14a and at another longitudinal end with the coupling 14b such that rotation of the coupling 14a about the axis R-R will bring about simultaneous rotational movement of the roller 22 about the same axis R-R. The speed of rotation of the roller 22 relative to the container 12 about the axis R-R may be from 1 revolution per minute (rpm) to 900 rpm. In use, pairs of brassieres are releasably engaged with the roller 22 for simultaneous rotational movement with the roller 22.

At the top of the container 12 are two nozzles 24 for spraying a dye onto the roller 22 in the container 12. Dye sprayed out from each of the nozzles 24 travels through a respective passage 26 which is in fluid communication with the interior cavity 20 of the container 12.

Dye solution is provided to the nozzles 24 at a raised pressure. More particularly, a motor 28 activates a pressurizer 30 to increase the pressure of the dye solution to around 15 kPa before being delivered to the nozzles 24 for subsequent spraying onto the roller 22 in the cavity 20 of the container 12. An air pump 32 is operable to draw air through an air duct 34 and to impart the air onto the dye sprayed out from the nozzles 24. The air imparted onto the dye sprayed out from the nozzles 24 atomizes the dye, e.g. down to nano-scale dye particles.

A volume of water (not shown) is kept at a bottom portion 36 of the container 12. Depending on the size of the container 12, the volume of the water may be from 20 litres to 4,500 litres. A heating tank 38 is provided below the container 12 for heating up the water in the container 12 and the container 12 itself. By way of such an arrangement, the temperature within the container 12 may be kept between 30° C. and 100° C., and the humidity within the container 12 may be maintained between 1% and 100%.

Figure 4:
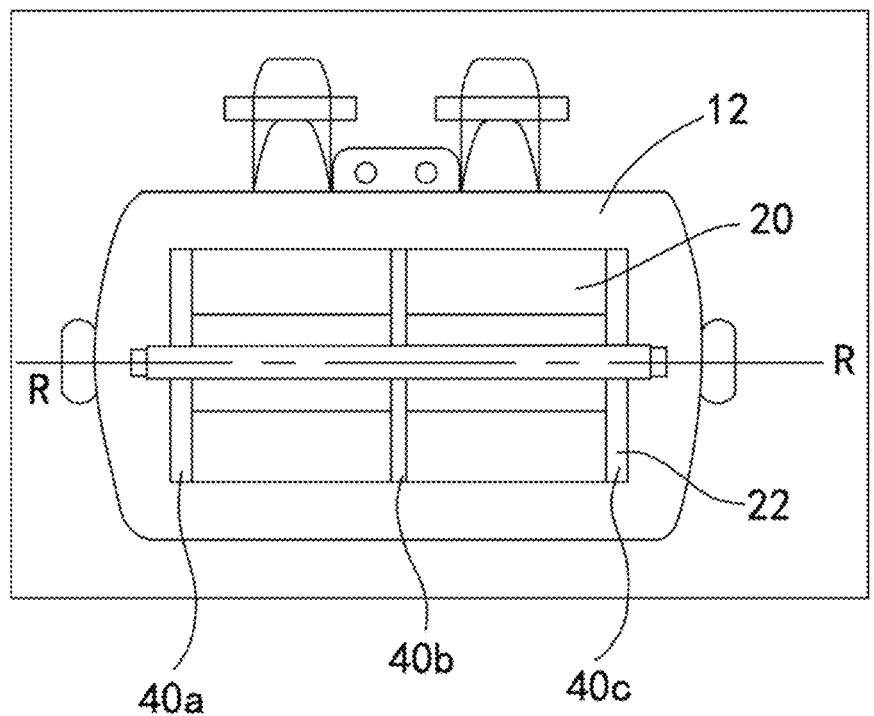
FIG. 4 is a front view of a container of the garment dyeing machine of FIG. 1, showing a roller inside.
Figure 5:
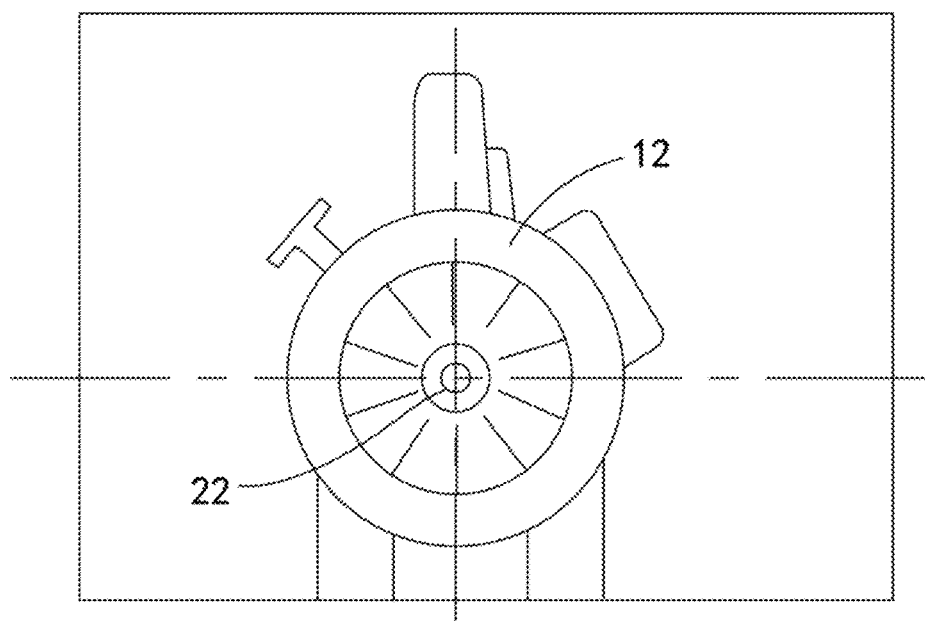
FIG. 5 is a side view of the container of FIG. 4.

FIGS. 4 and 5 show, respectively, a front view and a side view of the container 12 with the roller 22 contained within the interior cavity 20 of the container 12. While a single roller 22 is shown here, it is envisaged that two shorter rollers may be joined end-with-end with each other in such a way that the two rollers are rotatable simultaneously about the axis R-R.

Figure 6:
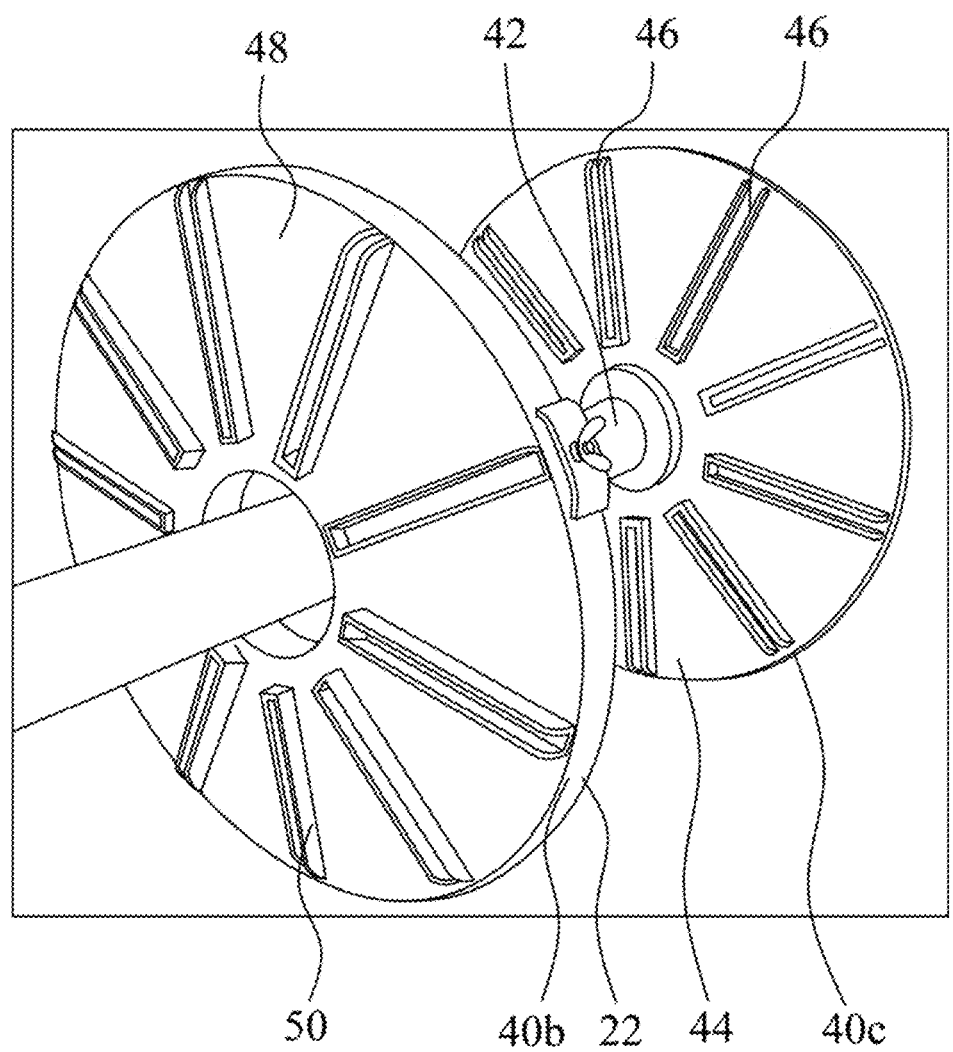
FIG. 6 is a partial perspective view of a body of the roller in FIG. 4.

FIG. 6 shows in more detail the construction of a body 39 of the roller 22. The body 39 is made of steel and includes three circular discs 40a, 40b, 40c, of which only the discs 40b, 46c are shown in FIG. 6. The three discs 40a, 40b, 40c are of the same size, and are arranged parallel to and concentric with one another. An axle 42 is coupled with the discs 40a, 40b, 40c for simultaneous movement. In particular, longitudinal ends of the axle 42 are releasably engageable with the couplings 14a, 14b in the container 12. When so assembled, the central longitudinal axis of the axle 42 (which forms the central longitudinal axis of the body 39, and thus of the roller 22) coincides with the axis R-R about which the axle 42 and roller 22 are rotatable relative to the container 12.

On a major surface 44 of the disc 40c facing the disc 40b and on a major surface of the disc 40b facing the disc 40c are a number of pairs of radially extending tracks 46. For each pair of tracks 46, one track 46 is provided on the major surface 44 of the disc 40c facing the disc 40b and the other track 46 is provided on the major surface of the disc 40b facing the disc 40c. Both tracks 46 of the same pair are parallel to each other and of the same length. Similarly, on a major surface 48 of the disc 46b facing the disc 40a and on a major surface of the disc 40a facing the disc 40b are provided a number of parallel and radially extending tracks 50 which are of the same length.

Figure 7:
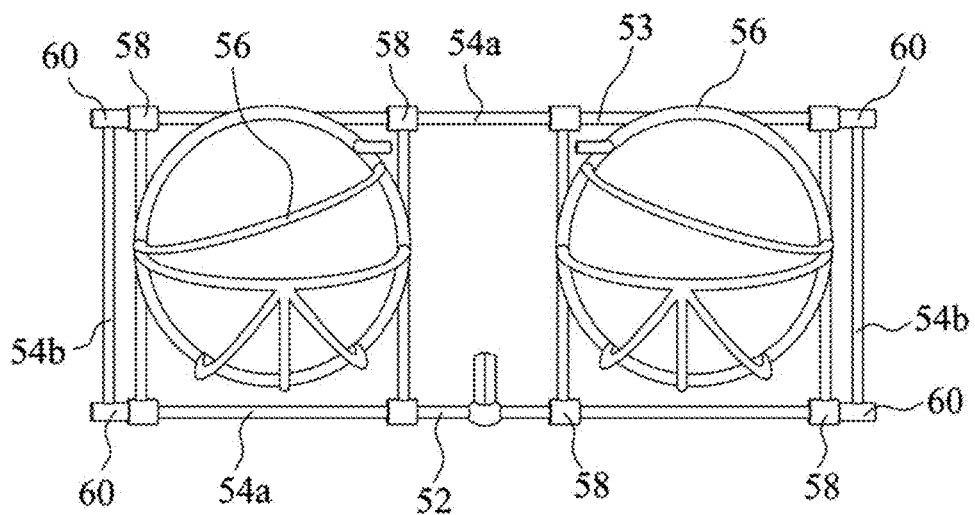
FIG. 7 is a perspective view of a hanging frame of the roller in FIG. 4.

FIG. 7 shows a steel hanging frame 52 for engagement with the body 39 to form the roller 22. The hanging frame 52 has a generally rectangular base frame 53 with two longer steel rods 54a and two shorter steel rods 54b joined with one another. Two cup-shaped parts 56, each with four parallel short tubes 58, are engaged with the base frame 53 such that the longer steel rods 54a are received through the tubes 58. By way of such an arrangement, the two cup-shaped parts 56 are movable relative to the base frame 53 and relative to each other to vary the distance between the two cup-shaped parts 56. As the cup-shaped parts 56 may be fitted into cups of a pair of brassieres releasably attached to the hanging frame 52, the above arrangement allows brassieres of different sizes to be releasably attached to the hanging frame 52 (and thus to the roller 22) for dyeing.

Each longitudinal end 60 of the longer rods 54a of the hanging frame 52 is receivable into and slidable relative to one of the tracks 46, 50 of the body 39 of the roller 22 to releasably engage the hanging frame 52 with the body 39 of the roller 22. A plurality of hanging frames 52 may be releasably engaged with the body 39 to form the roller 22. The exact number of hanging frames 52 which may be engaged with the body 39 depends on the number of pairs of parallel tracks 46, 50 provided on the discs 40a, 40b, 40c.

Figure 8:
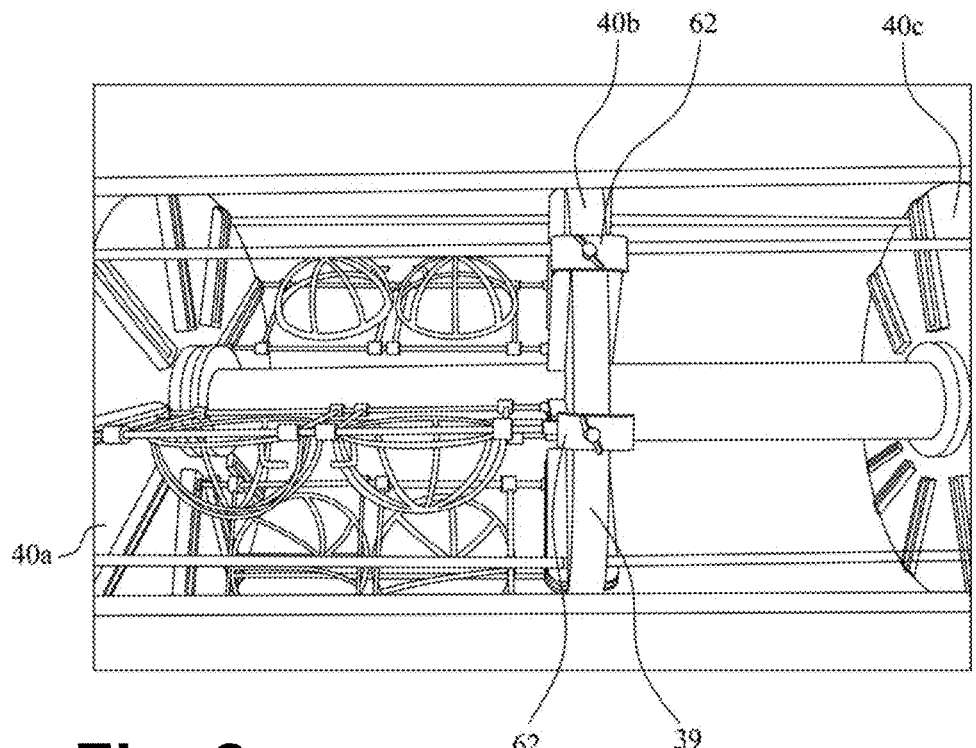
FIG. 8 shows engagement of a number of hanging frames of FIG. 7 to the body of FIG. 6 to form the roller.
Figure 9:
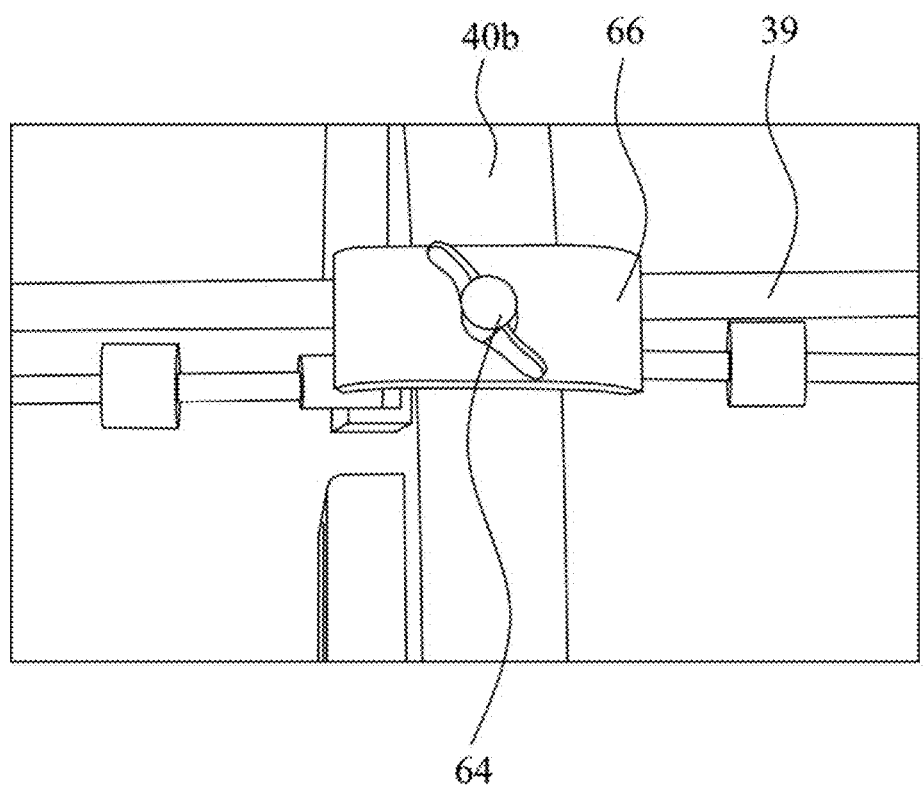
FIG. 9 shows a lock of the body of FIG. 6 in a locking position.
Figure 10:
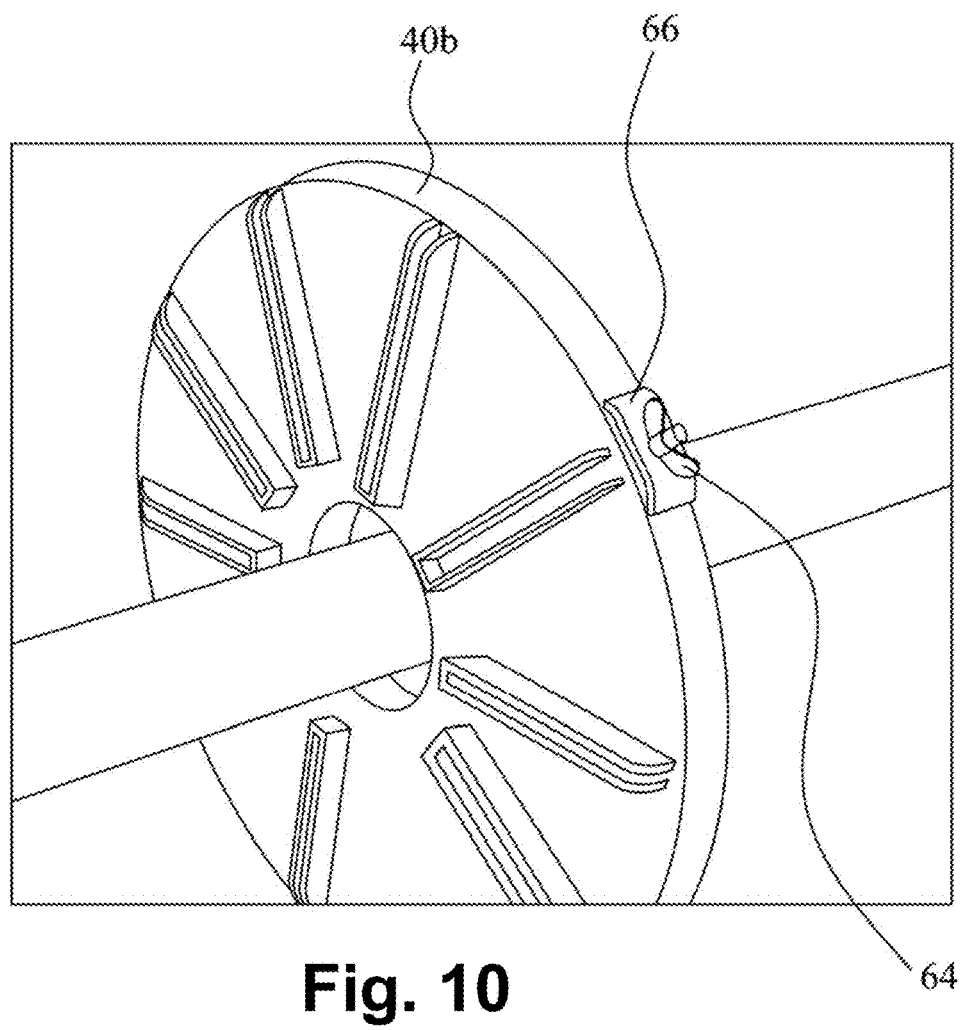
FIG. 10 shows the lock of the body of FIG. 9 in an un-locking position.

FIG. 8 shows three hanging frames 52 engaged with the body 39 by having the longitudinal ends 60 of their two longer rods 54a received into pairs of parallel tracks 50 on the discs 40a, 40b. On a peripheral rim of the disc 40b and adjacent an outer end of each track 50 on the disc 40b is a respective lock 62. As shown more clearly in FIGS. 9 and 10, each lock 62 includes a nut 64 and a lock plate 66. When the nut 64 is tightened against the disc 40b, the lock plate 66 is prevented from exhibiting any movement relative to the disc 40b; and when the nut 64 is unscrewed from the disc 40b, the lock plate 66 is allowed to move (such as rotate) relative to the disc 40b. By way of such an arrangement, when a hanging frame 52 is engaged with a pair of tracks 50, the lock plate 66 may be rotated to the position shown in FIG. 9 in which part of the lock plate 66 blocks the outer end of the track 50 on the disc 40b and the outer end of the track 46 on the disc 40b. The nut 64 may then be turned to tighten the lock plate 66 against the disc 40b (in which position the lock 62 is in a locking position) to prevent relative movement of the hanging frame 52 and the body 39, thus preventing detachment of the hanging frame 52 from the body 39. The hanging frame 52 may thus be locked with the body 39 for simultaneous rotation about the axis of rotation R-R without fear of accidentally being loosened from the body 39. If desired, the nut 64 may be unscrewed, thus allowing the lock plate 66 to rotate to the position shown in FIG. 10 (in which position the lock 62 is in an un-locking position) in which the outer end of the track 50 on the disc 40b and the outer end of the track on the disc 40b are not blocked, thus allowing the hanging frame 52 to be detached from the body 39. Similar locks 62 are provided on the respective peripheral rim of the discs 40a, 40c.

Figure 11:
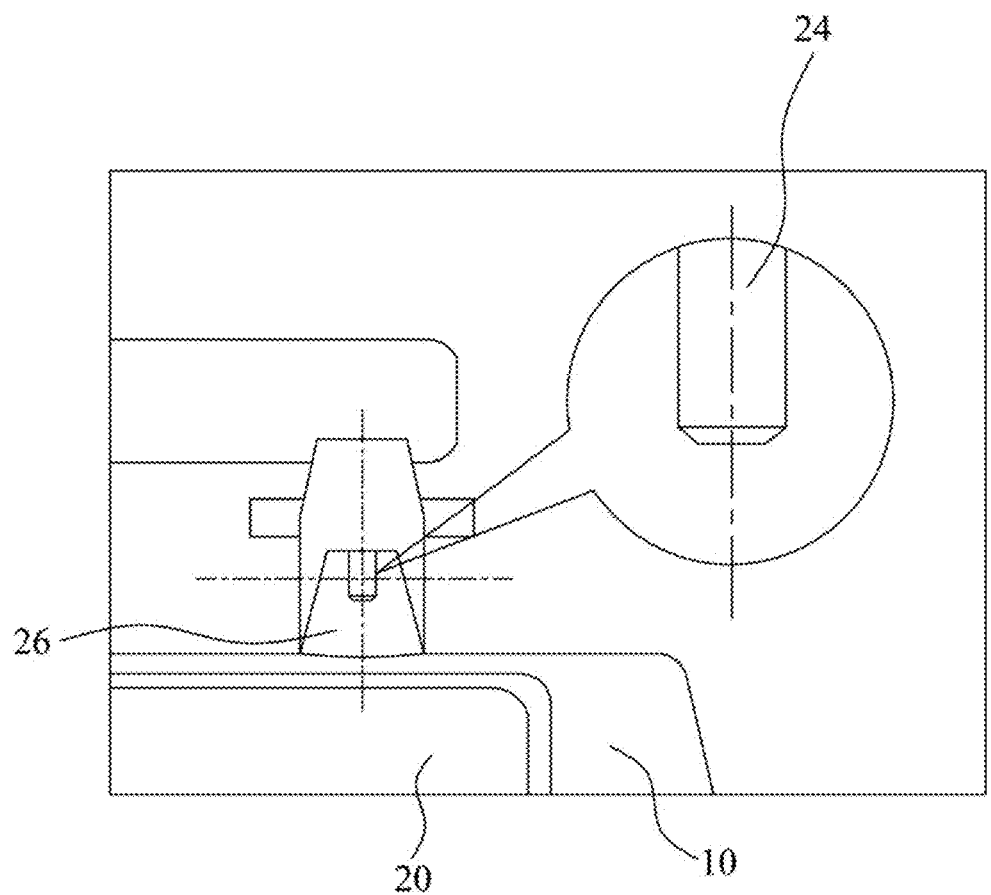
FIG. 11 shows a nozzle of the garment dyeing machine of FIG. 1, with the encircled part being an enlarged view of the nozzle.

FIG. 11 shows in more detail the arrangement of one of the nozzles 24 in the machine 10. Dye sprayed out from the nozzle 24 travels into the cavity 20 of the container 12 through the passage 26 which is in fluid communication with the interior cavity 20 of the container 12.

Figure 12:
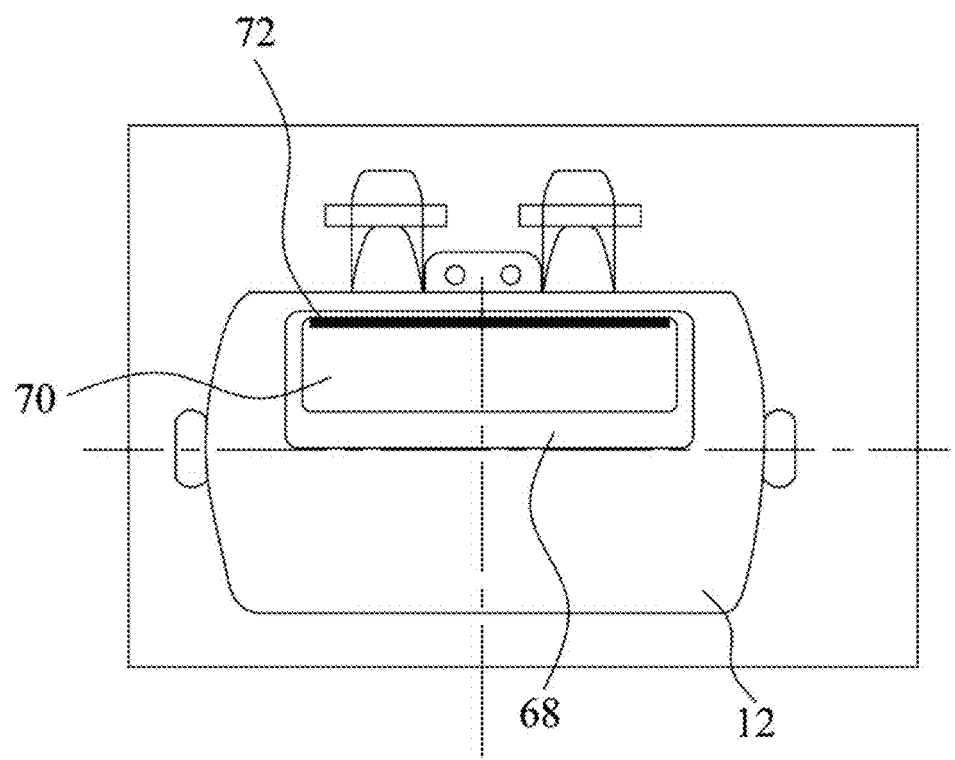
FIG. 12 is a further front view of the container of FIG. 4 with a door.

As shown in FIG. 12, a door 68 with a transparent viewing window 70, which may be made of glass, is provided. The viewing window 70 allows visual inspection of the interior cavity 20 of the container 12 during operation. The door 68 may be movable to open or close the container 12. In particular, the door 68 may be opened to allow access to the interior cavity 20, e.g. to install or remove the hanging frames 52.

Figure 13:
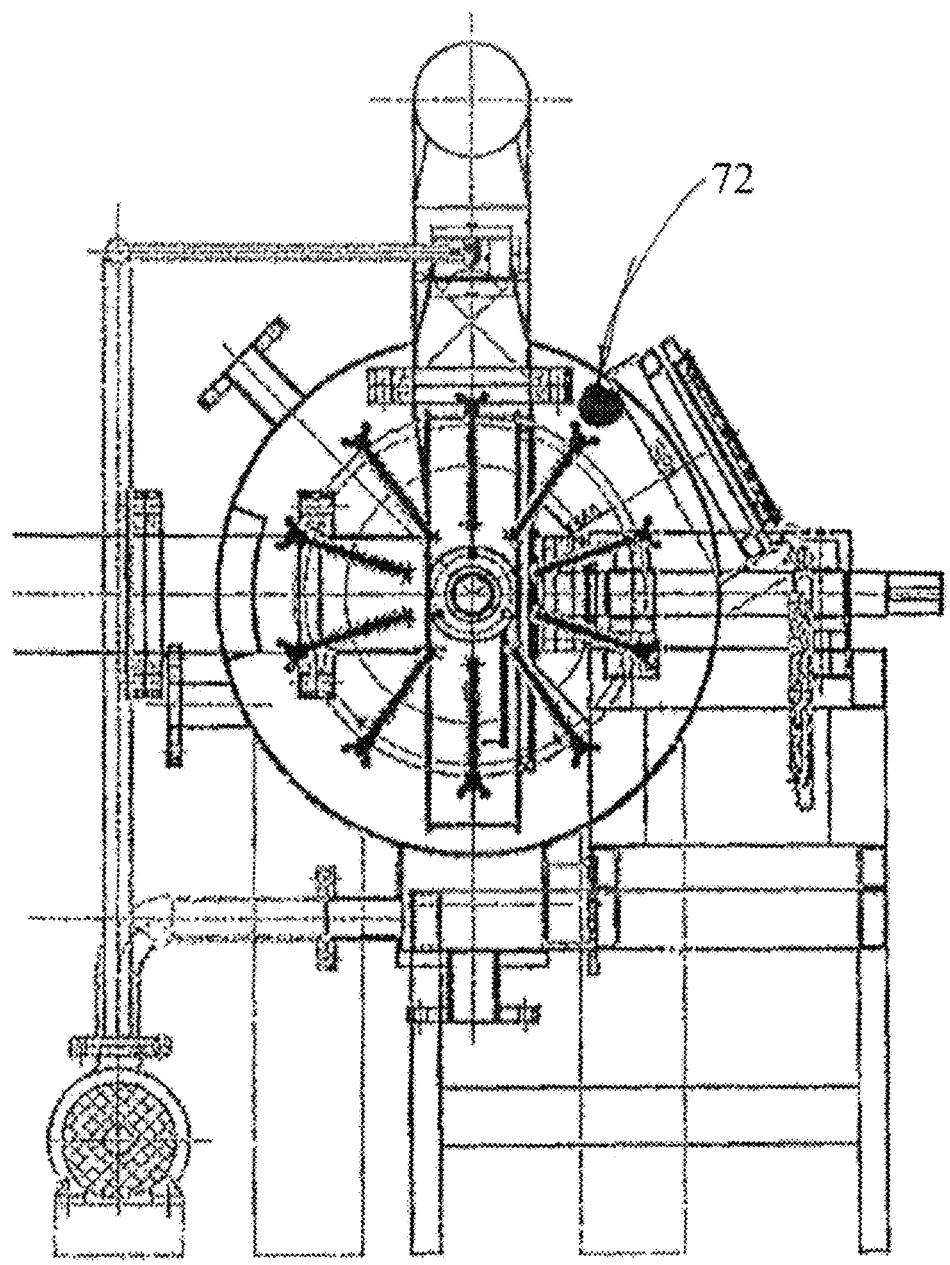
FIG. 13 is a further side view of the garment dyeing machine of FIG. 1 showing the position of a ultra-violet (UV) light.
Figures 14A, 14B:
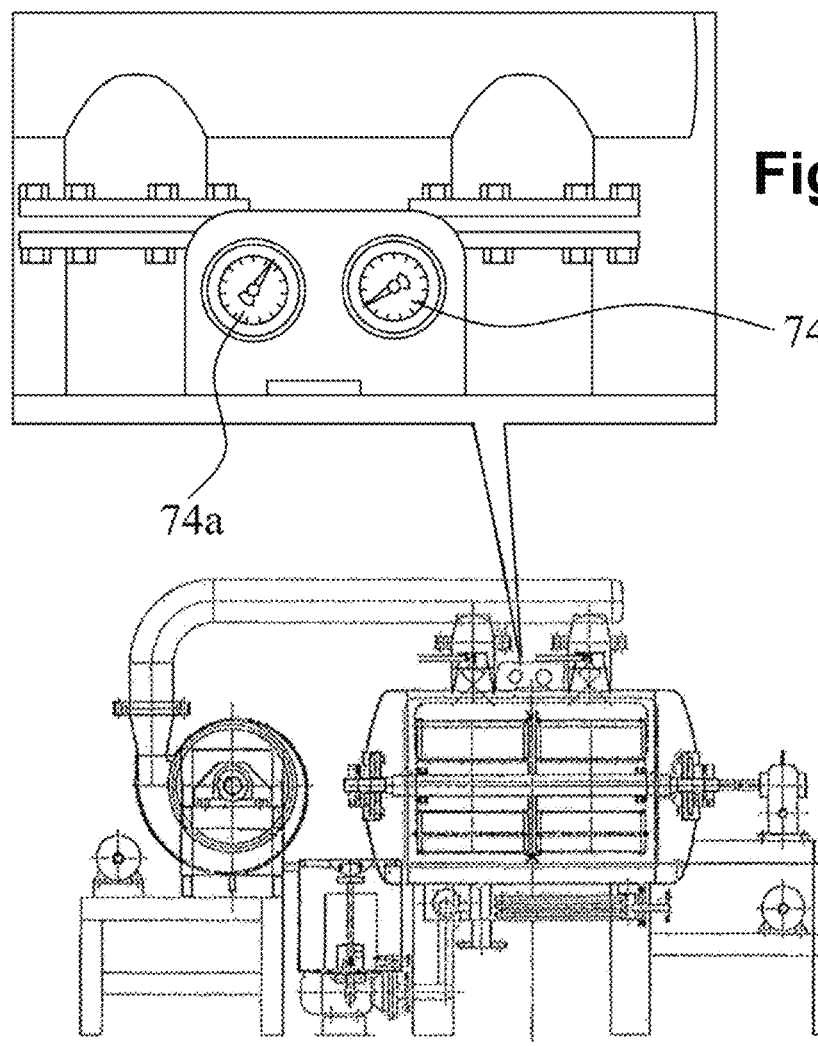
FIG. 14A is a further front view of the garment dyeing machine of FIG. 1.
FIG. 14B is an enlarged view of part of the garment dyeing machine of FIG. 14A.

As shown in FIGS. 12 and 13, an ultra-violet (UV) light 72 is provided at an upper region in the interior cavity 20 of the container 12 for treatment of the pieces of garment (e.g. brassieres) dyed in the machine 10. The temperature and humidity in the interior cavity 20 of the container 12 are continuously monitored during operation of the machine 10, and are shown in display meters 74a, 74b, as shown in FIGS. 14A and 14B.

Figure 15:
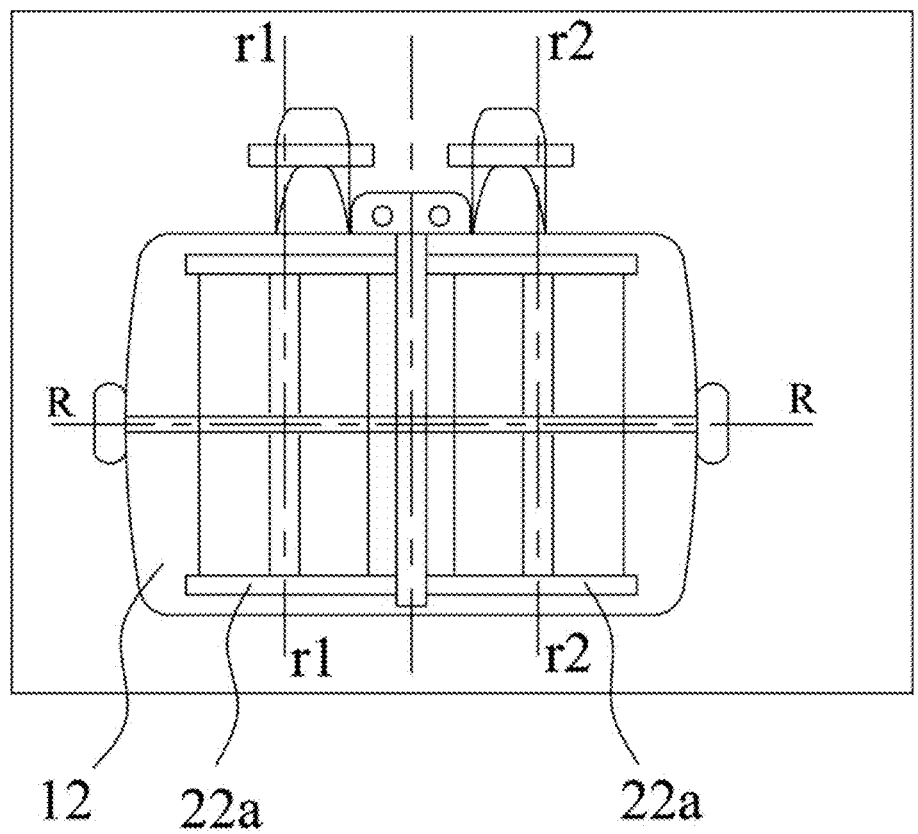
FIG. 15 is a further front view of the container of the garment dyeing machine of FIG. 1 with rollers engaged with the container in a different orientation.

FIG. 15 shows a pair of rollers 22a installed in the container 12 of the machine 10 in an orientation different from that shown in FIGS. 1 and 4. In particular, in the arrangement shown in FIG. 15, the respective central longitudinal axis $r_1$-$r_1$, $r_2$-$r_2$ of the two rollers 22a are perpendicular to the axis of rotation R-R of the container 12 and of the rollers 22a. It is envisaged that the rollers 22a may also be installed in the container 12 of the machine 10 such that the respective central longitudinal axis $r_1$-$r_1$, $r_2$-$r_2$ of the rollers 22a are inclined at an angle relative to the axis of rotation R-R of the container 12 and of the rollers 22a.

During operation, pairs of brassieres (not shown) are releasably attached to the hanging frames 52, with the cup-shaped parts 56 received within the cups of the brassieres. The hanging frames 52 are then engaged with the body 39 of the rollers 22, which are then caused to rotate about the axis R-R. The brassieres are thus continuously rotated about the axis R-R during the dyeing process. Pressurized dye solution (which is further atomized into nano-sized particles by pressurized air) is sprayed by the nozzles 24 onto the brassieres. Water in the bottom portion 36 and heated by the heating tank 38 maintains the humidity and temperature in the cavity 20 of the container 12 at an appropriate level, and helps in enhancing the dyeing effect. As the dye solution is atomized, more even, detailed and controllable dyeing effect can be achieved. It is also found in practice that, as compared with the use of conventional dyeing machines, significantly less water is required to be used in the machine 10 according to the present invention. In particular, in the operation of conventional garment dyeing machines, the fabric to dye solution ratio by weight is roughly 1:4, whereas in the operation of the garment dyeing machine 10 according to the present invention, the fabric to dye solution ratio by weight is reduced to 1:1. In addition, as the internal cavity 20 of the container 12 in which the dyeing process is carried out is closed off from the outside environment by the door 68, significantly less energy is required.

It should be understood that the above only illustrates and describes examples whereby the present invention may be carried out, and that modifications and/or alterations may be made thereto without departing from the spirit of the invention.

It should also be understood that certain features of the invention, which are, for clarity, described in the context of separate embodiments, may be provided in combination in a single embodiment. Conversely, various features of the invention which are, for brevity, described in the context of a single embodiment, may also be provided separately or in any appropriate sub-combinations.

What is claimed is:

1. A garment dyeing machine comprising:
   a container,
   at least one roller to which at least one piece of a garment is releasably attachable, said roller being within said container and rotatable relative to said container about an axis of rotation of said container, and
   at least one nozzle adapted to spray a dye solution onto said roller,
   wherein said roller is releasably engageable with said container in a first position in said container in which a longitudinal axis of said roller is substantially parallel to said axis of rotation and a second position in said container in which said longitudinal axis of said roller is substantially perpendicular to said axis of rotation, and
   wherein said roller is rotatable relative to said container about said axis of rotation of said container when said roller is in said first position and in said second position.

2. The machine according to claim 1, further comprising a plurality of rollers within said container.

3. A garment dyeing machine comprising:
   a container,
   at least one roller to which at least one piece of a garment is releasably attachable, said roller being within said container and rotatable relative to said container about an axis of rotation, and
   at least one nozzle adapted to spray a dye solution onto said roller,
   wherein said roller includes a body and at least one hanging frame which are releasably engageable with each other for simultaneous rotational movement about said axis of rotation,
   wherein said hanging frame has a base frame and two cup-shaped parts adapted to be fitted into cups of a pair of brassieres releasably attached to said hanging frame, and
   wherein said cup-shaped parts are engaged with two substantially parallel rods of said base frame, whereby said cup-shaped parts are slidably movable relative to said rods of said base frame and relative to each other.

4. The machine according to claim 3 further comprising at least one lock which, when said hanging frame is engaged with said body of said roller, is movable between a first position in which relative movement between said hanging frame and said body of said roller is prevented and a second position in which relative movement between said hanging frame and said body of said roller is allowed.

5. The machine according to claim 1, further comprising at least one ultra-violet light within said container.

6. The machine according to claim 1, further comprising a pump adapted to pressurize said dye solution to a pressure of around 15 kPa.

7. The machine according to claim 1, further comprising a heating tank adapted to maintain a temperature within said container between 30° C. and 100° C.

8. The machine according to claim 1, wherein said container includes a bottom portion adapted to hold a volume of water.

9. The machine according to claim 8 wherein said volume of water is from 20 liters to 4,500 liters.

10. The machine according to claim 8, wherein said volume of water is adapted to maintain a humidity within said container between 1% and 100%.

11. The machine according to claim 1, wherein said roller is rotatable relative to said container at a speed of from 1 revolution per minute (rpm) to 900 rpm.

12. The machine according to claim 1, wherein said container includes a door movable to selectively open and close said container.

* * * * *